United States Patent
Moenne-Loccoz

(10) Patent No.: US 10,265,604 B2
(45) Date of Patent: Apr. 23, 2019

(54) SHOCK ABSORBING DEVICE DESIGNED TO BE MOUNTED TO A SNOW SLIDING BOARD

(71) Applicant: SKIS ROSSIGNOL, Saint-Jean de Moirans (FR)

(72) Inventor: Arnaud Moenne-Loccoz, Moirans (FR)

(73) Assignee: SKIS ROSSIGNOL, Saint-Jean de Moirans (FR)

( * ) Notice: Subject to any disclaimer, the term of this patent is extended or adjusted under 35 U.S.C. 154(b) by 0 days.

(21) Appl. No.: 15/268,944

(22) Filed: Sep. 19, 2016

(65) Prior Publication Data
US 2017/0080324 A1    Mar. 23, 2017

(30) Foreign Application Priority Data
Sep. 21, 2015  (FR) ...................... 15 70042

(51) Int. Cl.
| | | |
|---|---|---|
| A63C 5/07 | (2006.01) | |
| A63C 5/075 | (2006.01) | |
| F16F 1/376 | (2006.01) | |
| F16F 3/093 | (2006.01) | |
| A63C 5/12 | (2006.01) | |

(52) U.S. Cl.
CPC .............. *A63C 5/075* (2013.01); *A63C 5/122* (2013.01); *A63C 5/128* (2013.01); *F16F 1/376* (2013.01); *F16F 3/093* (2013.01); *A63C 2203/20* (2013.01)

(58) Field of Classification Search
CPC ........... A63C 5/07; A63C 5/075; A63C 5/122; A63C 5/128; A63C 2203/20
See application file for complete search history.

(56) References Cited

U.S. PATENT DOCUMENTS

| | | | | |
|---|---|---|---|---|
| 2,258,046 A | * | 10/1941 | Clement | ................... A63C 5/07 280/602 |
| 3,762,070 A | * | 10/1973 | Culver | ................... G09B 23/32 434/274 |
| 4,896,895 A | * | 1/1990 | Bettosini | ................... A63C 9/00 280/607 |
| 5,395,132 A | * | 3/1995 | Abondance | .............. A63C 9/00 280/607 |

(Continued)

FOREIGN PATENT DOCUMENTS

| | | |
|---|---|---|
| EP | 0639392 A1 | 2/1995 |
| EP | 0743081 A2 | 11/1996 |
| EP | 0826397 A1 | 3/1998 |

OTHER PUBLICATIONS

French Search Report issued in French Patent Application No. 1570042 dated May 9, 2016.

*Primary Examiner* — Frank B Vanaman
(74) *Attorney, Agent, or Firm* — Marshall, Gerstein & Borun LLP

(57) ABSTRACT

A shock absorbing device designed to be mounted to a sliding board, includes a mobile device connected to a mechanism transmitting the forces generated during the deformation of the board and including a part of a deformable viscoelastic material, such that the part is shaped in such a way that its transversal section varies longitudinally in an increasing and decreasing manner, to form hollows and ridges, wherein the distance between the hollows and/or the distance between the ridges varies during the deformation of the part.

13 Claims, 4 Drawing Sheets

(56) References Cited

U.S. PATENT DOCUMENTS

| | | | | |
|---|---|---|---|---|
| 5,597,170 A | * | 1/1997 | Le Masson | A63C 5/07 280/602 |
| 5,775,716 A | * | 7/1998 | Harsanyi | A63C 5/07 280/602 |
| 5,845,923 A | * | 12/1998 | Zanco | A63C 9/00 280/602 |
| 5,865,459 A | * | 2/1999 | Piegay | A63C 5/07 280/602 |
| 5,915,717 A | * | 6/1999 | Faye | A63C 5/07 280/602 |
| 6,017,044 A | * | 1/2000 | Kawagoe | B60G 3/265 188/322.12 |
| 6,086,101 A | * | 7/2000 | Cormican | A63C 5/07 180/182 |
| 6,182,998 B1 | * | 2/2001 | Huyghe | A63C 5/075 280/602 |
| 8,182,269 B2 | * | 5/2012 | Rancon | A63C 5/003 280/626 |
| 2004/0178606 A1 | | 9/2004 | Ashley | |

* cited by examiner

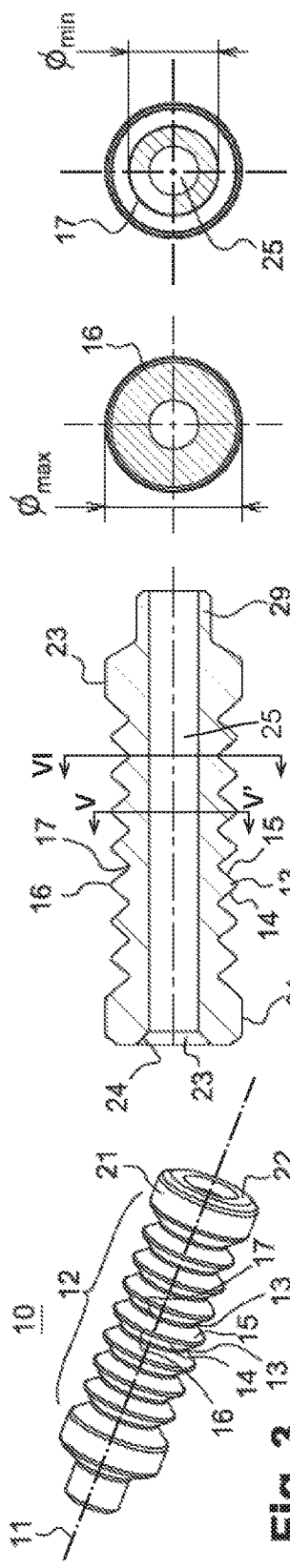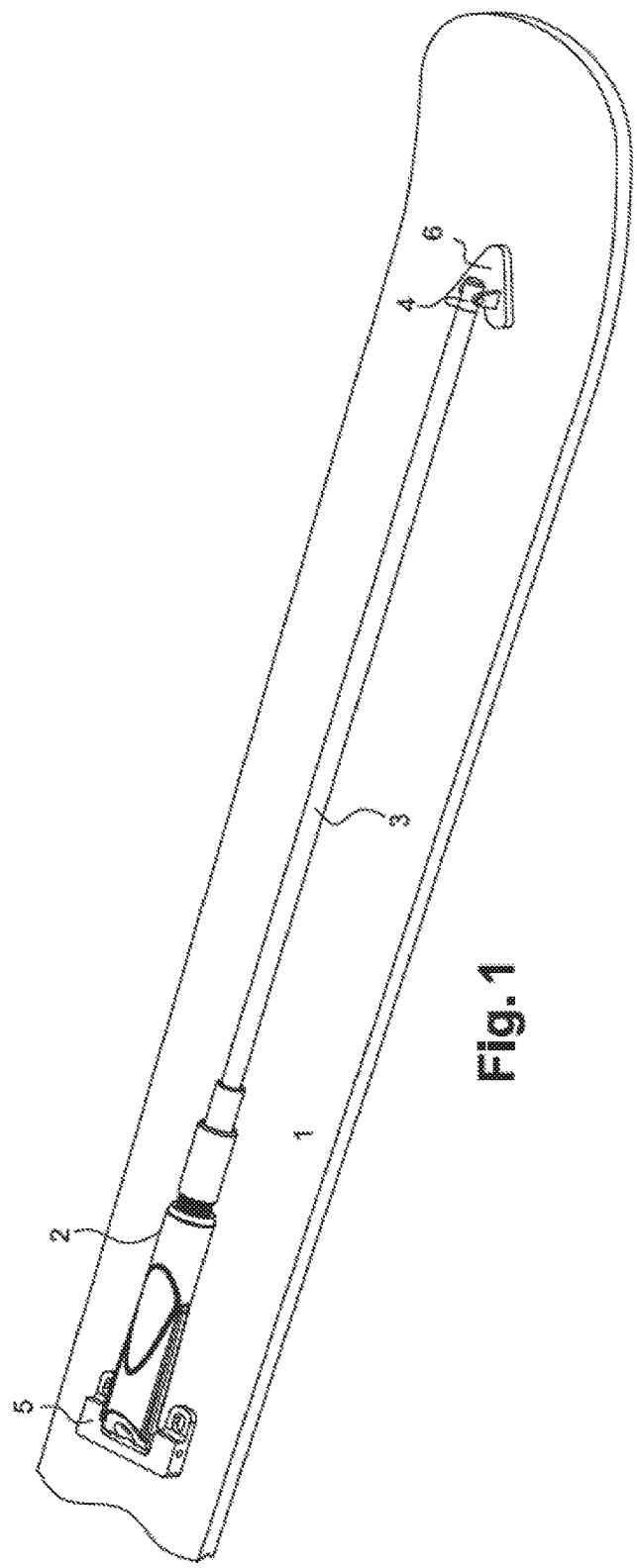

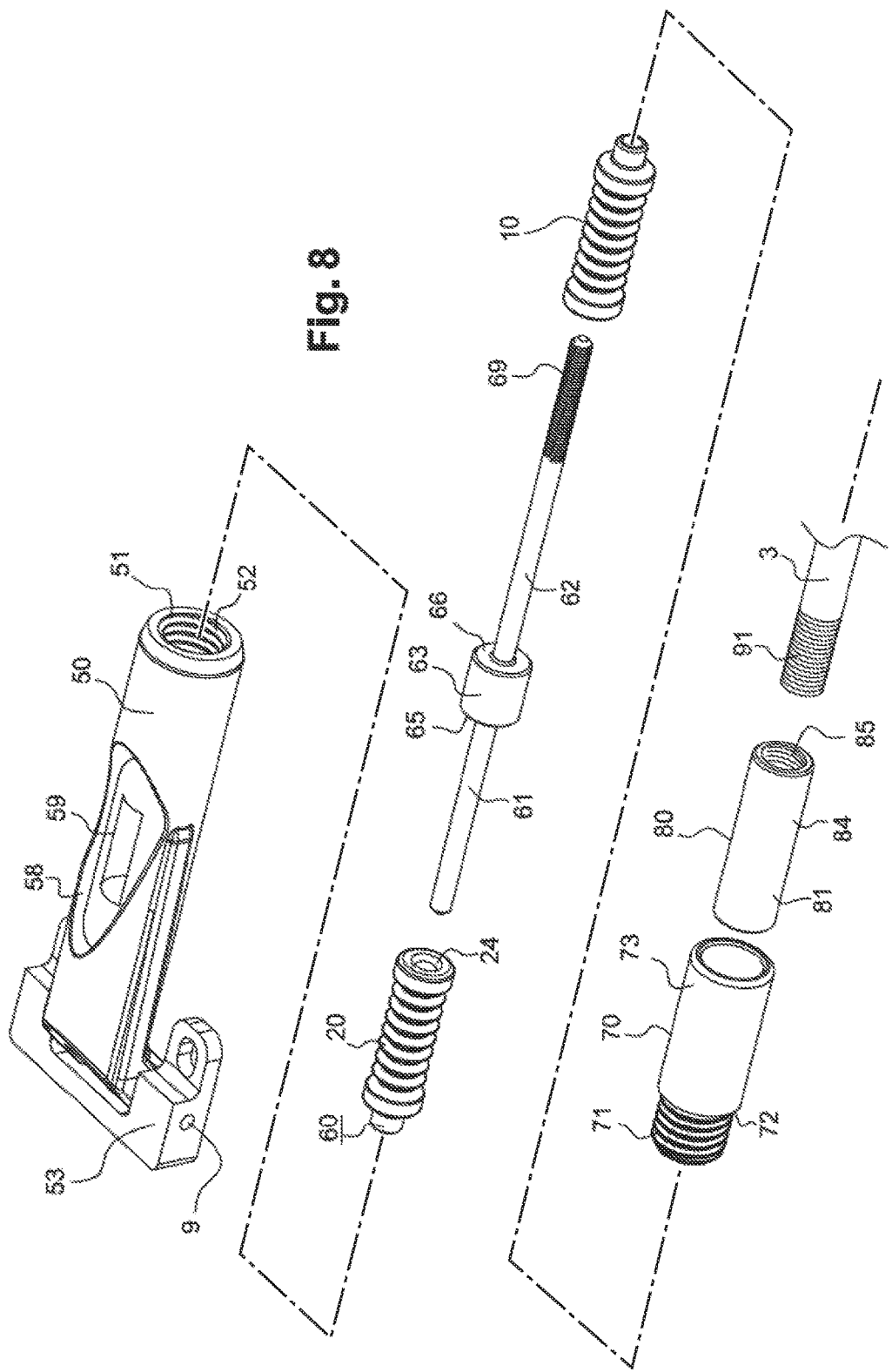

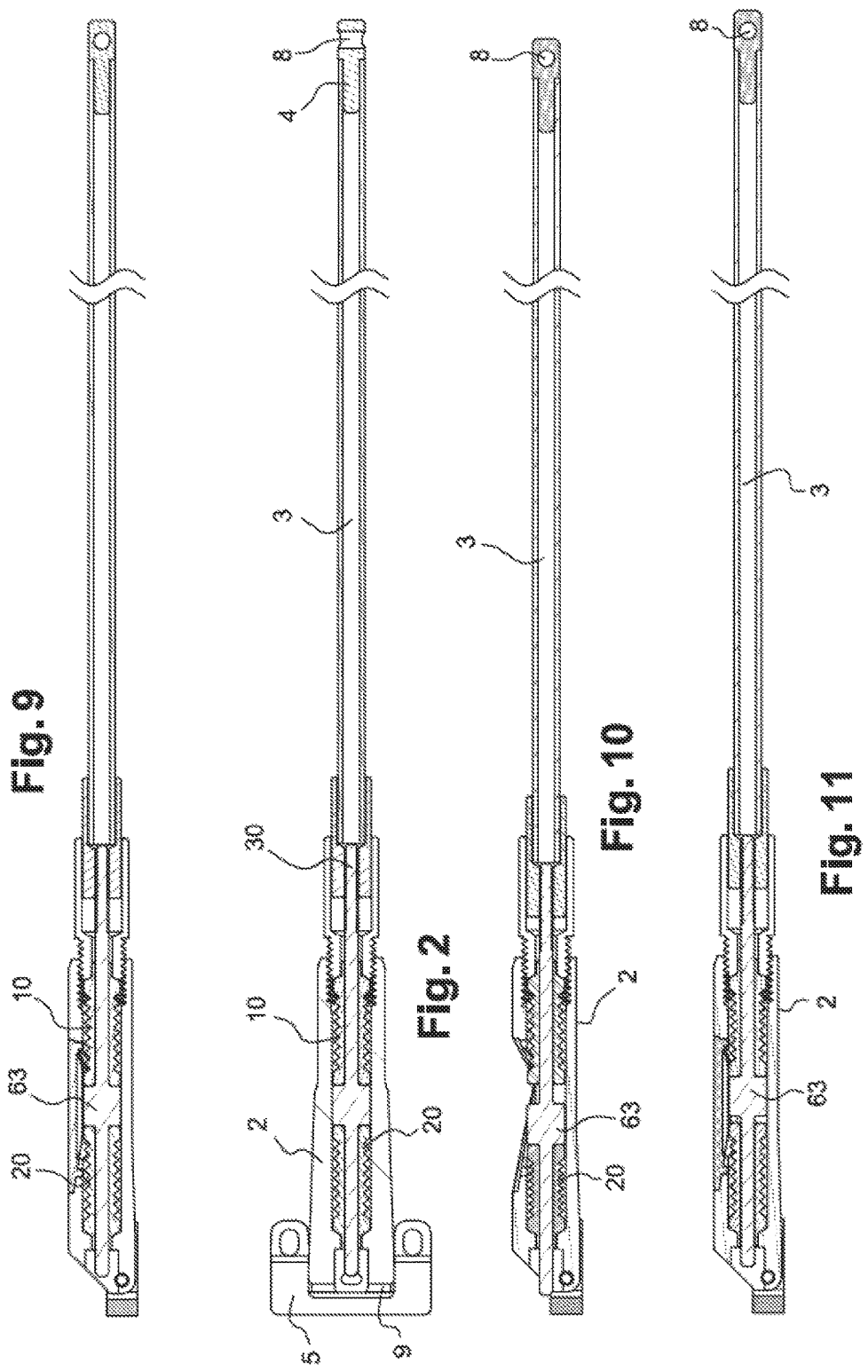

SHOCK ABSORBING DEVICE DESIGNED TO BE MOUNTED TO A SNOW SLIDING BOARD

CROSS-REFERENCE TO RELATED APPLICATIONS

This application claims the benefit of priority under 35 U.S.C. § . 119 of French patent application no. 1570042, filed Sep. 21, 2015, the entire contents of which are hereby incorporated herein by reference, in its entirety and for all purposes.

TECHNICAL DOMAIN

The disclosure concerns the domain of snow sliding boards and more particularly downhill skiing or snowboarding. More specifically, it concerns special arrangements designed to damp the forward or rearward movements of a sliding board.

BACKGROUND

Generally speaking, it is known that a sliding board is exposed to many vibration phenomena. Such vibration is due to the fact that the board moves over a surface having irregularities causing the end of the board to rise because of its relative flexibility. Gravity tends to attract the end of the board downwards, thus causing chattering phenomena. Such phenomena may continue over varying lengths of time depending on the mechanical properties of the board and in particular its stiffness and damping.

It is understandable that these hammering phenomena are not helpful in the accurate control of the board, the reason why damping devices have already been proposed to limit the scale and above all the duration of the vibration phenomena at the front tip of the board.

An interesting solution was proposed in document FR 1 407 710, describing a ski fitted with a damping system comprising an arm one end of which is integral with a fixed point in the front zone of the ski. The rear part of this arm is integral with a device comprising a damping component which may consist of a rubber block. When the front tip of the ski moves, the rigid arm compresses the rubber component at the opposite end of the arm. However, the principle described in this document does not optimize the performance of the shock absorber in terms of movement amplitude and of the amount of energy dissipated during the compression of the rubberized material. A similar solution described in the document US2004/0178606 consists in having the rubber block operate by shearing, by giving it shapes to facilitate the deformation of protruding portions. However, behavior like this is not totally satisfactory because the damping is relatively linear and not progressive.

SUMMARY

Therefore, there is a need to define more accurately the damping properties of the compressive element of this type of device by seeking sufficient energy dissipation to obtain a suitable and gradual damping factor, despite limited travel, on the order of a few tens of millimeters.

To do this, the Applicant has designed a damping device designed for mounting to a sliding board, comprising a mobile member connected to a mechanism transmitting the forces generated on the deformation of the board, including a deformable viscoelastic material part.

In keeping with the disclosure, this device is characterized in that the shape of the viscoelastic material part has a section in the transverse plane that varies longitudinally and alternatively, increasing and decreasing, to form hollows and ridges. The distance between the hollows and/or the distance between the ridges thus varies the deformation of this part.

In other words, the damping element comprises a succession of large and small diameter zones forming hollows and ridges and undulations in their section, generally accordion like.

In other words, the described embodiments consist in using as a damping element a part having a bellows-like geometry so that on compression, not only are there shearing phenomena inside the material but also a deformation of the various bellows, sometimes going as far as bringing two successive ridges into near absolute contact. This geometry produces an element with lower stiffness than a solid geometry element, which is not linear, generating shearing phenomena, while inducing the dissipation of energy and, accordingly damping, that are increased.

The geometry of the part can be arranged in different ways, in particular concerning the shapes of the zones separating the extremes of the diameter. Accordingly, in a first embodiment, a geometry can be used in which the section varies linearly between the two extremes, thus forming a sawtooth-type longitudinal profile. As an alternative, it is also possible that some portions that are not absolutely conical, or rectilinear, in their section, but adopt a certain curvature, required in particular for the manufacturing and casting of the characteristic part.

In practice, in a privileged embodiment, the characteristic part may revolve so that consistent mechanical behavior prevails on compression or relaxation. This part may also include a central channel through which a linkage transmission mechanism element passes. This central channel or passage enables the transmission mechanism to bear on the face of the viscoelastic material part located opposite the fixed point of the damping device.

The geometrical parameters of the characteristic part may also extend to a choice of inside and outside dimensions and the depth of the slots. Accordingly, in an initial embodiment, the ratio between the minimum outside diameter of the characteristic part and the diameter of the central channel is included between 1.5 mm and 2 mm. For constant overall dimensions, this ratio allows the quantity of viscoelastic material to be adjusted, and thereby, the overall damping performance.

In a complementary manner, the characteristic part can be designed while choosing the ratio between maximum outside diameter and minimum outside diameter of the part so that it is included between 1.25 mm and 2 mm. This ratio allows the depth of the slots generated in the outer face of the characteristic part to be determined, therefore having an influence on the maximum compression factor, the gradual longitudinal deformation of the part and the non-linearity of its stiffness and, thereby, for an equivalent quantity of matter, the damping performance.

The damping performances can also be adjusted by choosing different viscoelastic materials, and in particular their hardness. In practice, preference will be given to materials having Shore hardness of between 60 and 90 Shore A for good damping.

In an advantageous embodiment, the device may comprise a second viscoelastic material part having a different hardness from the hardness of the first viscoelastic part. In other words, the damping device will behave differently depending on the movement of the associated transmission mechanism. Accordingly, the first part may deform when the sliding board flexes whereas the second part may deform during the counter-flexing of the board.

The choice of the respective hardness of the two characteristic parts can be used to influence the behavior of the board. In a first embodiment, the viscoelastic material part deforms during the flexing of the board, having lower hardness than the viscoelastic material part which deforms during board counter-flexing. Accordingly, choosing a less hard material for the first part, compressed when the board flexes, allows substantial board deformation while offering greater damping of the board end rising movements. Conversely, as far as the opposite movement is concerned, causing the board end to move nearer to the ground, it is preferable for it to be of smaller amplitude and also less damped, an effect obtained by using a second harder part. This enables the board to recover its un-deformed state more quickly.

In practice, good behavior has been obtained with a first part of a material having hardness included between 60 and 90 Shore A, preferably near 80 Shore A, allowing the movements of the rod compressing this first part of up to approximately 8 mm. Conversely, the second part has higher hardness, exceeding 60 Shore D, leading to movements of the rod of approximately one millimeter.

Advantageously, in practice, the device may comprise a box structure within which the viscoelastic material parts are arranged. This box may have a transparent area level with the characteristic parts so that the deformations linked with the flexing and counter-flexing movements can be viewed.

BRIEF DESCRIPTION OF THE FIGURES

The method of producing the described apparatus, and the resulting advantages, are evident from the description of the resulting embodiments, with the attached figures in which:

FIG. 1 is a summary and partial perspective view of a ski fitted with the damping device, including the force transmission mechanism;

FIG. 2 is a longitudinal horizontal sectional view of the device of FIG. 1;

FIG. 3 is a summary perspective view of the part of the viscoelastic material innate in the device of FIG. 1;

FIG. 4 is a longitudinal sectional view of the part of FIG. 3;

FIGS. 5 and 6 are transverse sectional views of the part in the FIGS. 3 and 4 according to the drawings V-V' and VI-VI' of FIG. 4, respectively:

FIG. 8 is a summary perspective view illustrating the components of FIG. 7 separately and before assembly;

FIGS. 9, 10 and 11 are longitudinal vertical sectional views of the device in FIG. 1, as shown in positions corresponding respectively to rest, flexing movement and counter-flexing movement.

DETAILED DESCRIPTION

Figure 7:
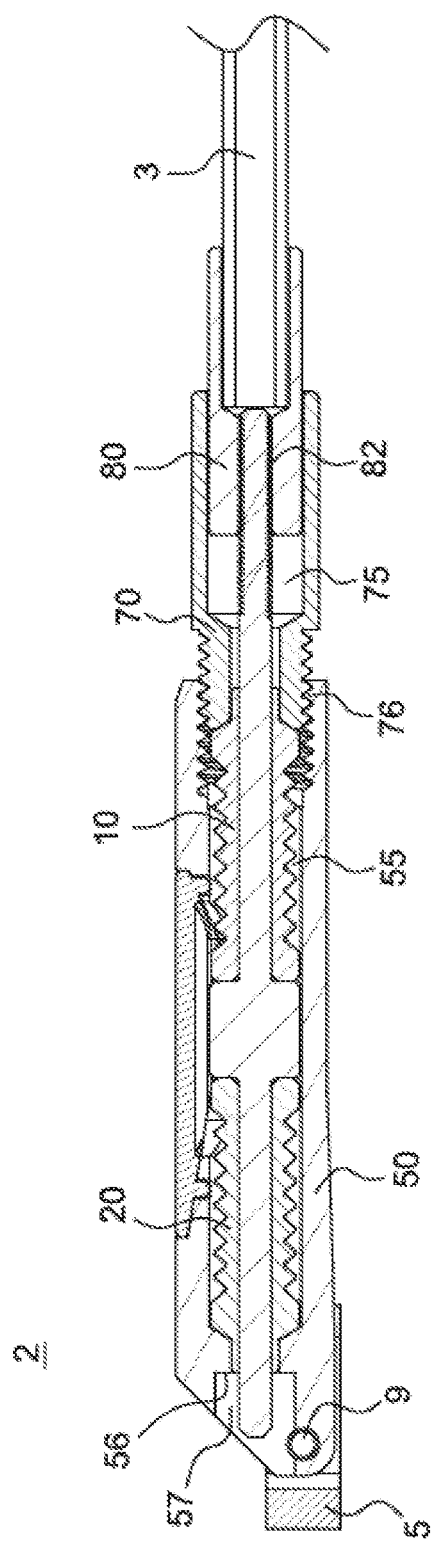
FIG. 7 is a vertical longitudinal section view of the part of the device from FIG. 1 in which the two viscoelastic material parts are integrated.

As illustrated in FIG. 1, the damping device 1 comprises essentially a linkage 3 forming the force transmission mechanism of which one end 4 is designed to be made integral with a fixed point of the sliding board, possibly by means of a part forming a pivot link 6, located approximately at a distance of a few centimeters, typically between 2 and 4 cm, behind the tip contact line of the ski. At the other end, the linkage 3 enters into a box 2 and is connected to a moving device 60. The box 2 including the parts of viscoelastic material is itself articulated by a pivoting link with respect to a clevis 5 designed to be attached to a remote point on the upper surface of the board. In the alternatives not shown, the box containing the viscoelastic material parts can be incorporated into a riser plate for the attaching elements, or may be situated under one of the attaching elements, or between the attaching elements.

The length of the linkage 3, and therefore the positioning of the box 2 may depend on the type of skiing being contemplated. Accordingly, for skiing with wide turns, the linkage may be between 40 and 50 cm long. For skiing with tighter turns, typically slalom skiing, the linkage may be shorter, on the order of 20 cm.

More specifically, and as illustrated in FIG. 2, the end 4 of the linkage 3 is provided with a drilled hole 8 accommodating a swiveling pin integral with a part not shown, mounted to the upper face of the board. At the other end, the pin 3 enters the box which contains two viscoelastic material elements 10, 20. The linkage 3 extends in a part 30 working together with the two viscoelastic elements 10, 20, according to the setup explained below. The zone of the box 2 placed opposite the linkage 3 has a widened shape including a transversal drilled hole 9 receiving a pin swiveling with respect to the part 5, itself attached to the board.

As illustrated in FIG. 3, the viscoelastic material part 10 has a shape revolving about a longitudinal pin 11. This part 10 has a central section 12 comprising a succession of elementary patterns 13 forming two truncated regions 14,15 connected in a circular zone 16 having a larger diameter and forming a ridge defining the maximum outside diameter of part 10. The elementary patterns 13 are connected to each other in a circular zone 17 having a smaller diameter, forming hollows and defining the minimum outside diameter of the part 10. The part 10 also has two end portions. A first portion 21, cylindrical in shape, with a diameter equal to or greater than the diameter of the slotted regions 13. This cylindrical region 21 has a plane end face 22, designed to be supported by a force transmission mechanism. This end face has a hole 23 drilled into its center, extended in the form of a cylindrical central channel 25. This hole 23 has a slightly truncated shape designed to facilitate the insertion of the transmission mechanism. The part 10 also has another end region 28 more or less circular in shape.

More specifically, the viscoelastic material part 10 has transverse sections changing longitudinally, alternately in increasing to a maximum diameter section as shown in FIG. 5, and in decreasing to a minimum diameter section as illustrated in FIG. 6. The maximum diameter $\varnothing_{max}$ is on the order of 11 mm and the minimum diameter $\varnothing_{min}$ is on the order of 8 mm. The diameter $\varnothing_{int}$ of the central channel is on the order of 4 mm. In the illustrated shape, part 10 has 7 elementary patterns, extending longitudinally over 21 mm. In a particular embodiment example, the chosen material is based on SEBS, having an 80 Shore A hardness or a 60 Shore D hardness, depending on the direction of the movement to be damped.

In other words, the viscoelastic material part 10 is generally in the shape of a bellows or accordion. This shape imparts non-linear stiffness to this part. Indeed, in a range of small movements during the compression of this part, stiffness is low because the bellows have not yet closed up. Then, beyond these small movements, for larger movements, the stiffness increases by 25 to 60% depending on the shape chosen, as soon as the bellows begin to close up and its folds touch. Accordingly, the ends of the ski can deform and chatter more freely during small movements while the major chattering of the ski ends will be limited and stopped quickly. As an example, for a viscoelastic material part with hardness of 80 Shore A, the lowest stiffness corresponds to small movements of between 0 and 4 mm whereas the greatest stiffness corresponds to higher amplitude movements exceeding 4 mm, essentially between 4 and 8 mm.

The way the parts of viscoelastic material are positioned inside the damping device is illustrated in the FIGS. 7 and 8. Accordingly, the main box 2 comprises a housing 50 which extends more or less longitudinally in the axis of the linkage 3. This housing 50 is more or less cylindrical in shape and has an opening 51 on the side turned toward the linkage 3. Opposite, the body 50 has arrangements 53 in particular a transversal drilled hole 9 for the assembly of a swiveling pin with respect to the clevis 5 mounted on the upper face of the board.

The opening 51 makes it possible for the cylindrical housing 55 to be kept clear so that any elements inserted into it may slide. In the illustrated form, the body 50 has a transparent zone 58 on the upper side, displaying part of the components contained in the box 50, through a window 59.

The viscoelastic material parts 20,10 are slipped onto a rod 60, having two portions 61,62 separated by a central region having a larger diameter 63. The viscoelastic material parts 10, 20 are each installed on either side of the central region 63. Opposite the opening 51 of the box 2, the cylindrical housing 55 ends in a vertical flat against which the smaller diameter end of the part 20 abuts. A hole is drilled into the center of this vertical flat allowing the free movement of the end of the rod 60 during the operation of the damping device. The other end of the viscoelastic material part 20, and more specifically of its flat face 22 comes into contact with the opposite face 65 of the central portion 63 of rod 60.

The other viscoelastic material part 10 is installed on portion 62 of rod 60, in such a way that the plane face of its portion having the largest diameter comes into contact with the plane face 66 of the central portion 63 of rod 60. In other words, the parts 10, 20 respectively bear on either side of the central portion 63 of the rod 60 to form a piston.

The end 51 of the housing 55 is threaded to accommodate additional threading 71 of an initial portion 72 of the closing device 70. The screwing of the part 70 onto the box 2 is also a way of adjusting the endmost position with respect to the box, of the elastomer part 10 opposite the central portion 63 of rod 60. Part 70 also has a widened portion 73 into which the sleeve 80 mounted to the end of the linkage 3 can be inserted. More specifically, this sleeve 80 has a first portion 81, having a threaded hole 82 into which the end 69 of the rod 60 is screwed. The sleeve 80 also has a portion 84 itself provided with a threaded hole 85 and into which the threaded end 91 of the linkage 3 is screwed. Accordingly, the linkage 3, the sleeve 80 and the rod 60 are made integral and move longitudinally together. In one alternative, not illustrated, the rod and the linkage may form a single part. The central opening 75 made in the part 70 is large enough to allow the deflection of the sleeve 80 during the movements of the linkage 3.

The operation of the device can be illustrated by the positions taken in FIGS. 9, 10 and 11. Accordingly, in the position of FIG. 9, the system is at rest and the board is not flexed and central portion 63 of the rod 60 is in an intermediate position so that no compression force is applied to the viscoelastic material parts 10,20. When the board is flexed, corresponding to the lifting of one of the ends, the linkage 3 moves so that its attachment point 8 moves closer to box 2. In this case, the linkage pushes the rod 60 back into the box 2 through the sleeve 80. The central portion 63 of the rod 60 pushes against the viscoelastic material part 20 at the bottom of the box 2, compressing this part. The shearing phenomena that then occur during the compression and deformation of this element 20 lead to the damping of the board bending movement.

Conversely, in the configuration shown in FIG. 11, corresponding to the counter-bending movement, with the end of the board initially moved upwards being returned back downwards to a position where it is closer to the rest state of the board, the end 8 of the linkage 3 moves away from the box 2. In this case, the rod 60 tends to extend out of box 2 and the central portion 63 comes into contact with the opposite flat surface of the element 10. In this case, the viscoelastic material element 10 is compressed between the central portion 63 of the rod on the one hand and the plug formed by part 70 sealing off the housing 55 on the other. In the same way, the shearing phenomena that then occur during the compression and deformation of this elastomer element 10 lead to the damping of the board counter-flexing movement.

Of course, depending on the desired damping performances, the materials and geometry of the viscoelastic material parts will be chosen accordingly. Naturally, it is also possible to equip the box with a single viscoelastic material element if the movements are to be damped in one direction only. In general, as already mentioned, it might be preferable to damp essentially the flexing movements, while the counter-flexing movements are only slightly damped, or not even damped at all. In the latter case, the viscoelastic material part is then the particularly rigid, serving simply as a stop, and might even be replaced by a rigid washer so as to reduce the dimensions of the box.

In another alternate embodiment, the viscoelastic material parts could be removable and interchangeable so that the user can choose the hardness of the parts depending on the desired handling on snow. In particular, in this case the transparent zone could be removable.

The device offers a multitude of advantages, especially that of offering suitable and non-linear stiffness chosen to obtain a board that is less affected by the irregularities of the ground, making it easier to direct. The shape and the material chosen for the deformable viscoelastic material part ensure efficient damping while taking up a small volume of space.

What is claimed is:

1. A sliding board equipped with a shock absorbing device comprising a mobile device connected to a mechanism transmitting forces generated during deformation of the board and including a first element formed of a deformable viscoelastic material, wherein the first element is shaped in such a way that its transverse section varies longitudinally in an alternately increasing and decreasing manner, to form hollows and ridges, wherein the distance between the hollows and/or the distance between the ridges varies during the deformation of the first element, wherein the shape of the first element imparts (i) a first stiffness, due to the compressibility of the hollows and ridges, during a first range of motion between a position where the hollows and ridges are not compressed and a position where the hollows and ridges are compressed, and (ii) a second stiffness different from the first stiffness, due to the compressibility of the viscoelastic material, during a second range of motion after the hollows and ridges are compressed, and wherein the first element comprises a central channel through which an element of the mechanism transmitting the forces passes.

2. A sliding board according to claim 1, wherein the first element has a shape of revolution.

3. A sliding board according to claim 1, wherein the transverse section of the first element varies linearly between two extremes.

4. A sliding board according to claim 1, wherein the first element has Shore hardness included between 60 and 90 Shore A.

5. A sliding board according to claim 1, further comprising a second element formed of viscoelastic material whose hardness is different from the hardness of the first element, wherein the second element is shaped in such a way that a transverse section of the sliding element varies longitudinally in an alternately increasing and decreasing manner, to form hollows and ridges, wherein the distance between the hollows and/or the distance between the ridges varies during the deformation of the second element, wherein the shape of the second element imparts (i) a first stiffness, due to the compressibility of the hollows and ridges, during a first range of motion between a position where the hollows and ridges are not compressed and a position where the hollows and ridges are compressed, and (ii) a second stiffness different from the first stiffness, due to the compressibility of the viscoelastic material, during a second range of motion after the hollows and ridges are compressed, and wherein the second element comprises a central channel through which the element of the mechanism transmitting the forces passes.

6. A sliding board according to claim 5, further comprising a box containing the first element and/or the second element.

7. A sliding board according to claim 6, wherein the box includes a transparent zone level with the first element and/or the second element contained in the box.

8. A sliding board according to claim 5, wherein the first element deforms when the sliding board flexes and the second element deforms when the sliding board is counter-flexed.

9. A sliding board according to claim 8, wherein the one of the first and second elements that deforms when the sliding board flexes offers hardness less than that of the other of the first and second elements which deforms during the counter-flexing of the sliding board.

10. A sliding board according to claim 9, wherein the first element has hardness included between 60 and 90 Shore A, and the second element has hardness in excess of 60 Shore D.

11. A sliding board according to claim 5, in which the second element has a hardness higher than the first element.

12. A sliding board according to claim 5, in which the first element and the second element are removable.

13. A sliding board according to claim 1, wherein the mechanism includes a linkage connected to a piston which abuts against a face of the first element.

* * * * *